United States Patent
Hirata et al.

(10) Patent No.: US 8,540,543 B2
(45) Date of Patent: Sep. 24, 2013

(54) METHOD FOR CONTINUOUSLY MANUFACTURING LIQUID CRYSTAL DISPLAY PANEL AND INSPECTION METHOD

(75) Inventors: Satoshi Hirata, Ibaraki (JP); Takuya Nakazono, Ibaraki (JP); Tomokazu Yura, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/242,795

(22) Filed: Sep. 23, 2011

(65) Prior Publication Data

US 2012/0238176 A1 Sep. 20, 2012

(30) Foreign Application Priority Data

Mar. 18, 2011 (JP) .................................. 2011-060335

(51) Int. Cl.
*H01J 9/24* (2006.01)
(52) U.S. Cl.
USPC .............................. 445/24; 349/88; 438/758
(58) Field of Classification Search
CPC ................ G01N 2021/9513; H01J 2237/3174; H01L 22/306; H01L 22/20
USPC .............. 445/24–25; 349/96; 428/447–448; 438/618
See application file for complete search history.

(56) References Cited

U.S. PATENT DOCUMENTS

2011/0025958 A1 2/2011 Koshio et al.

FOREIGN PATENT DOCUMENTS

| JP | 4-178545 A | 6/1992 |
|----|------------|--------|
| JP | 06-235624 A | 8/1994 |
| JP | 08-152416 A | 6/1996 |
| JP | 10-132758 A | 5/1998 |
| JP | 11-248637 A | 9/1999 |
| JP | 11-248643 A | 9/1999 |
| JP | 2000-028546 A | 1/2000 |
| JP | 2001-281096 A | 10/2001 |
| JP | 2003-262843 A | 9/2003 |
| JP | 2004-301882 A | 10/2004 |
| JP | 2005-127989 A | 5/2005 |
| JP | 2005-351825 A | 12/2005 |
| JP | 2006-078317 A | 3/2006 |
| JP | 2007-256106 A | 10/2007 |
| JP | 2009-276757 A | 11/2009 |
| JP | 2010-170126 A | 8/2010 |

OTHER PUBLICATIONS

Furuya et al Japanese Patent Application Publication 2003-262843 Sep. 2003 machine translation.*
Koshio et al Japanese Patent Application Publication 2010-170126 May 2010 machine translation.*

(Continued)

*Primary Examiner* — Tracie Y Green
(74) *Attorney, Agent, or Firm* — Westerman, Hattori, Daniels & Adrian, LLP

(57) ABSTRACT

The invention is a method for continuously manufacturing a liquid crystal display panel. In the method, the manufacturing step and the inspection step are performed on a continuous feeder. The inspection step includes applying a line-shaped light beam from one side with respect to the feeder to the liquid crystal display panel being fed; and imaging a region irradiated with the line-shaped light beam in the liquid crystal display panel, wherein the imaging is continuously performed in a line pattern parallel to a width direction of the feeder and performed at a position that is on another side with respect to the feeder and tilted at a predetermined angle to a feed direction of the feeder or a direction opposite thereto with respect to a direction in which the line-shaped light beam is applied.

10 Claims, 7 Drawing Sheets

(56) References Cited

OTHER PUBLICATIONS

Japanese Office Action dated Nov. 18, 2011, issued in corresponding Japanese Patent Application No. 2011-060335.
Extended European Search Report dated Jun. 29, 2012, issued in corresponding European Patent Application No. 11185696.9-1228, (7 pages).

English translation of Office Action, Notification of Reasons for Refusal, dispatch date Jul. 7, 2011.
Korean Office Action dated Oct. 26, 2012, issued in corresponding Korean patent application No. 10-2011-0036129, w/ English translation.

* cited by examiner the outline of the foreign body is blurred

METHOD FOR CONTINUOUSLY MANUFACTURING LIQUID CRYSTAL DISPLAY PANEL AND INSPECTION METHOD

BACKGROUND OF THE INVENTION

1. Field of the Invention

The invention relates to a system and a method for continuously manufacturing a liquid crystal display panel and to an inspection; apparatus and an inspection method.

2. Description of the Related Art

Japanese Patent Application Laid-Open (JP-A) No. 2010-170126 discloses a method and a system for manufacturing a liquid crystal display panel by a process including the steps of laminating polarizing films on both the front and back surfaces of a liquid crystal cell to form a liquid crystal display panel and optically inspecting the liquid crystal display panel. Specifically, the disclosed inspecting step includes perpendicularly applying light to the lower surface of the liquid crystal display panel from a light source, imaging the transmitted light to obtain image data, and subjecting the obtained image data to image analysis to determine the presence or absence of a defect so that it can be determined whether the product is non-defective or defective.

Patent document 1: Japanese Patent Application Laid-Open JP-A No. 2010-170126.

Unfortunately, the disclosure in Japanese Patent Application Laid-Open (JP-A) No. 2010-170126 has a problem in which foreign bodies contained in a liquid crystal display panel cannot be easily detected. The reason is as follows. If a foreign body exists between a liquid crystal cell and a polarizing plate, only part of the polarizing plate where the foreign body exits should be deformed and undergo the cancellation of the crossed Nicols state so that only the part should form a white image due to light leakage. Actually, however, when a light source and a camera are placed opposite to each other, as shown in FIGS. 7A and 7B, not only the light generated by the cancellation of the crossed Nicols state but also light refracted, scattered, or reflected by the foreign body enter the camera. As a result, the noise increases around the foreign body (the contrast decreases) so that the outline of the foreign body is blurred, which causes a problem in which the foreign body cannot be easily detected (the inspection precision decreases).

SUMMARY OF THE INVENTION

The invention has been made under the above circumstances, and an object of the invention is to provide a system and a method for continuously manufacturing a liquid crystal display panel, and an inspection apparatus and an inspection method, which enable high precision inspection of liquid crystal display panels being fed at high speed so that liquid crystal display panels of high quality can be continuously manufactured at high speed.

As a result of many studies to solve the problems, the invention described below has been accomplished.

The invention is directed to system for continuously manufacturing a liquid crystal display panel, includes:

an apparatus for manufacturing a liquid crystal display panel by a process including cutting a first long polarizing plate to form a first polarizing plate while feeding the first-long polarizing plate from a first polarizing plate roll and bonding the first polarizing plate to first side of a liquid crystal cell, which is being fed, and cutting a second long polarizing plate to form a second polarizing plate while feeding the second long polarizing plate from a second polarizing plate roll and bonding the second polarizing plate to second side of the liquid crystal cell, which is being fed, in such a manner that absorption axis of the first polarizing plate and absorption axis of the second polarizing plate are perpendicular to each other;

an inspection apparatus for optically inspecting the liquid crystal display panel being fed; and a continuous feeder for feeding the liquid crystal cell and the liquid crystal display panel, wherein the manufacturing apparatus and the inspection apparatus are arranged on the continuous feeder, wherein the inspection apparatus includes:

a light application unit that is placed on one side with respect to the feeder so as to apply a line-shaped light beam to the liquid crystal display panel being fed by the feeder, wherein the line-shaped light beam is parallel to a width direction of the feeder; and an image pickup unit that is placed on, another side with respect to the feeder and disposed in a position tilted at a predetermined angle to a feed direction of the feeder or a direction opposite thereto with respect to a direction in which the line-shaped light beam is applied from the light application unit, wherein the image pickup unit is for continuously imaging a region irradiated with the line-shaped light beam in the liquid crystal display panel being fed by the feeder, and the imaging is performed in a line pattern parallel to a width direction of the feeder.

According this feature, the line-shaped light beam is applied to the liquid crystal display panel being fed, and scattered light passing through the liquid crystal display panel is continuously imaged in a line pattern, so that foreign bodies existing between a liquid crystal cell and a polarizing plate are successfully imaged with sharp contrast over the whole of the liquid Crystal display panel being fed at high speed (the noise around the foreign bodies is reduced, because light scattered by the foreign bodies can be selectively imaged). Thus, high precision inspection is successfully performed while liquid crystal display panels are fed at high speed, so that liquid crystal display panels of high quality can be continuously manufactured at high speed.

This inspection makes it possible to perform high-precision detection of not only foreign bodies existing between a liquid crystal cell and a polarizing plate (such as bonding air bubbles, cullet, lint, dust, and dirt) but also stains and the like.

In an embodiment of the invention, the light application unit applies the line-shaped light beam in a direction perpendicular to the liquid crystal display panel. According to this feature, even when the liquid crystal display panel is misaligned during the feeding (for example, when the direction of the long or short side of the liquid crystal display panel becomes non-parallel to the feed direction of the feed line which is formed by feeder), light leakage (noise) caused by such misalignment can be reduced so that high, inspection precision can be maintained.

In an embodiment of the invention, the image pickup unit is disposed in each of positions tilted at a predetermined angle to the feed direction of the feeder and the direction opposite thereto with respect to the direction in which the line-shaped light beam is applied from the light application unit. This feature makes it possible to detect a foreign body that dots not strongly scatter light toward the downstream of the feed direction but strongly scatters light toward the upstream with respect to the direction in which the line-shaped light beam is applied, and also makes it possible to detect a foreign body that does not strongly scatter light toward the upstream but strongly scatters light toward the downstream, so that the liquid crystal display panel can be inspected with higher precision.

In view of high precision inspection of the liquid crystal display panel, the image pickup unit is also preferably disposed in each of positions that are tilted to the feed direction of the feeder and the direction opposite thereto and symmetrical with respect to the direction in which the line-shaped light beam is applied from the light application unit.

In view of high precision inspection of the liquid crystal display panel, the image pickup unit is also preferably disposed to be tilted at an angle of 1° to 45° with respect to the direction in which the line-shaped light beam is applied from the light application unit.

The invention is directed to a method for continuously manufacturing a liquid crystal display panel, includes:

a manufacturing step that comprises cutting a first long polarizing plate to form a first polarizing plate while feeding the first long polarizing plate from a first polarizing plate roll and bonding the first polarizing plate to first side of a liquid crystal cell which is being fed, and cutting a second long polarizing plate to form a second polarizing plate while feeding the second long polarizing plate from a second polarizing plate roll and bonding the second polarizing plate to second side of the liquid crystal cell which is being fed in such a manner that absorption axis of the first polarizing plate and absorption axis of the second polarizing plate are perpendicular to each other, so that a liquid crystal display panel is manufactured; and an inspection step of optically inspecting the liquid crystal display panel being fed, wherein the manufacturing step and the inspection step are performed on a continuous feeder for feeding the liquid crystal cell and the liquid crystal display panel, and the inspection step includes: applying a line-shaped light beam from one side with respect to the feeder to the liquid crystal display panel being fed by the feeder, wherein the line-shaped light beam is parallel to a width direction of the feeder; and imaging a region irradiated with the line-shaped light-beam in the liquid crystal display panel, wherein the imaging is continuously performed in a line pattern parallel to a width direction of the feeder and performed at a position that is on another side with respect to the feeder and tilted at a predetermined angle to a feed direction of the feeder or a direction opposite thereto with respect to a direction in which the line-shaped light beam is applied.

According this feature, the line-shaped light beam is applied to the liquid crystal display panel being fed, and scattered light passing through the liquid crystal display panel is continuously imaged in a line pattern, so that foreign bodies existing between a liquid crystal cell and a polarizing plate are successfully imaged with sharp contrast over the whole of the liquid crystal display panel being fed at high speed (the noise around the foreign bodies is reduced, because light scattered by the foreign bodies can be selectively imaged). Thus, high precision inspection is successfully performed while liquid crystal display panels are fed at high speed, so that liquid crystal display panels of high quality can be continuously manufactured at high speed.

In an embodiment of the invention, the light application unit applies the line-shaped light beam in a direction perpendicular to the liquid crystal display panel. According to this feature, even when the liquid crystal display panel is misaligned during the feeding (for example, when the direction of the long or short side of the liquid crystal display panel becomes non-parallel to the feed direction of the feed line which is formed by the feeder), light leakage (noise) caused by such misalignment can be reduced so that high inspection precision can be maintained.

In an embodiment of the invention, the image pickup unit is disposed in each of positions tilted at a predetermined angle to the feed direction of the feeder and the direction opposite thereto with respect to the direction in which the line-shaped light beam is applied from the light application unit. This feature makes it possible to detect a foreign body that does not strongly scatter, light toward the downstream of the feed direction but strongly scatters light toward the upstream with respect to the direction in which the line-shaped light beam is applied, and also makes it possible to detect a foreign body that does not strongly scatter light toward the upstream but strongly scatters light toward the downstream, so that the liquid crystal display panel can be inspected with higher precision.

In view of high precision inspection of the liquid crystal display panel, the region irradiated with the line-shaped light beam in the liquid crystal display panel is also preferably imaged in a line pattern at positions symmetrically tilted to the feed direction of the liquid crystal display panel and the direction opposite thereto with respect to the direction in which the line-shaped light beam is applied.

In view of high precision inspection of the liquid crystal display panel, the imaging is also preferably performed in such a manner that the region irradiated with the line-shaped light beam in the liquid crystal display panel is imaged in a line pattern at a position or positions tilted at an angle of 1° to 45° with respect to the direction in which the line-shaped light beam is applied.

The invention is directed to a inspection apparatus for optically inspecting a liquid crystal display panel being fed by a feeder, includes:

light application unit that is placed on one side with respect to the feeder so as to apply a line-shaped light beam to the liquid crystal display panel being fed by the feeder, wherein the line-shaped light beam is parallel to a width direction of the feeder; and an image pickup unit that is placed on another side with respect to the feeder and disposed in a position tilted at a predetermined angle to a feed direction of the feeder or a direction opposite thereto with respect to a direction in which the line-shaped light beam is applied from the light application unit, wherein the image pickup unit is for continuously imaging a region irradiated with the line-shaped light beam in the liquid crystal display panel being fed by the feeder, and the imaging is performed in a line pattern parallel to a width direction of the feeder.

According this feature, the line-shaped light beam is applied to the liquid crystal display panel being fed, and scattered light passing through the liquid crystal display panel is continuously imaged in a line pattern, so that foreign bodies existing between a liquid crystal cell and a polarizing plate are successfully imaged with sharp contrast over the whole of the liquid crystal display panel being fed at high speed (the noise around the foreign bodies is reduced, because light scattered by the foreign bodies can be selectively imaged). Thus, high precision inspection is successfully performed while liquid crystal display panels are fed at high speed.

In an embodiment of the invention, the light application unit applies the line-shaped light beam in a direction perpendicular to the liquid crystal display panel. According to this feature, even when the liquid crystal display panel is misaligned during the feeding (for example, when the direction of the long or short side of the liquid crystal display panel becomes non-parallel to the feed direction of the feed line which is formed by the feeder), light leakage (noise) caused by such misalignment can be reduced so that high inspection precision can be maintained.

In an embodiment of the invention, the image pickup unit is disposed in each of positions tilted at a predetermined angle to the feed direction of the feeder and the direction opposite thereto with respect to the direction in which the line-shaped light beam is applied from the light application unit. This feature makes it possible to detect a foreign body that does not strongly scatter light toward the downstream of the feed direction but strongly scatters light toward the upstream with respect to the direction in which the line-shaped light beam is applied, and also makes it possible to detect a foreign body that does not strongly scatter light toward the upstream but strongly scatters light toward the downstream, so that the liquid crystal display panel can be inspected with higher precision.

In view of high precision inspection of the liquid crystal display panel, the image pickup unit is also preferably disposed in each of positions that are tilted to the feed direction of the feeder and the direction opposite thereto and symmetrical with respect to the direction in which the line-shaped light beam is applied from the light application unit.

In view of high precision inspection of the liquid crystal display panel, the image pickup unit is also preferably disposed to be tilted at an angle of 1° to 45° with respect to the direction in which the line-shaped light beam is applied from the light application unit.

The invention is directed to a method for optically inspecting a liquid crystal display panel being fed by a feeder, includes:

applying a line-shaped light beam from one side with respect to the feeder to the liquid crystal display panel being fed by the feeder, wherein the line-shaped light beam is parallel to a width direction of the feeder; and imaging a region irradiated with the line-shaped light beam in the liquid crystal display panel, wherein the imaging is continuously performed in a line pattern parallel to a width direction of the feeder and performed at position that is on another side with respect to the feeder and tilted at a predetermined angle to a feed direction of the feeder or a direction opposite thereto.

According to this feature, the line-shaped light beam is applied to the liquid crystal display panel being fed, and scattered light passing through the liquid crystal display panel is continuously imaged in a line pattern, so that foreign bodies existing between a liquid crystal cell and a polarizing plate are successfully imaged with sharp contrast over the whole of the liquid crystal display panel being fed at high speed (the noise around the foreign bodies is reduced, because light scattered by the foreign bodies can be selectively imaged). Thus, high precision inspection is successfully performed while liquid crystal display panels are fed at high speed.

In an embodiment of the invention, the light application unit applies the line-shaped light beam in a direction perpendicular to the liquid crystal display panel. According to this feature, even when the liquid crystal display panel is misaligned during the feeding (for example, when the direction of the long or short side of the liquid crystal display panel becomes non-parallel to the feed direction of the feed line which is formed by the feeder), light leakage (noise) caused by such misalignment can be reduced so that high inspection precision can be maintained.

In an embodiment of the invention, the image pickup unit is disposed in each of positions tilted at a predetermined angle to the feed direction of the feeder and the direction opposite thereto with respect to the direction in which the line-shaped light beam is applied from the light application unit. This feature makes it possible to detect a foreign body that does not strongly scatter light toward the downstream of the feed direction but strongly scatters light toward the upstream with respect to the direction in which the line-shaped light beam is applied, and also makes it possible to detect a foreign body that does not strongly scatter light toward the upstream but strongly scatters light toward the downstream, so that the liquid crystal display panel can be inspected with higher precision.

In view of high precision inspection of the liquid crystal display panel, the region irradiated with the line-shaped light beam in the liquid crystal display panel is also preferably imaged in a line pattern at positions symmetrically tilted to the feed direction of the liquid crystal display panel and the direction opposite thereto with respect to the direction in which the line-shaped light beam is applied.

The imaging is also preferably such that the region irradiated with the line-shaped light beam in the liquid crystal display panel is imaged in a line pattern at a position or positions tilted at an angle of 1° to 45° with respect to the direction in which the line-shaped light beam is applied.

DETAILED DESCRIPTION OF THE PREFERRED EMBODIMENTS

Figure 1:
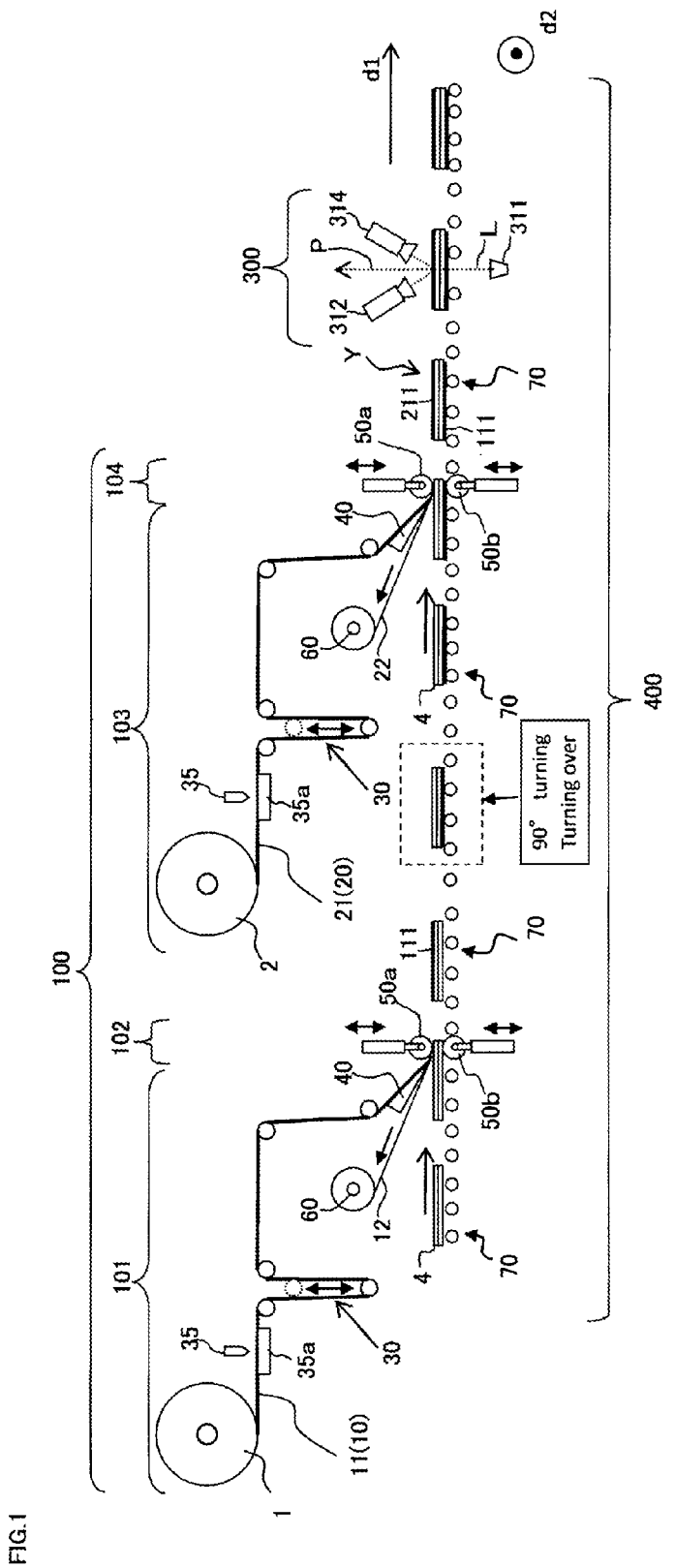
FIG. 1 is a schematic diagram showing an example of the system for continuously manufacturing a liquid crystal display panel.

The system and the method for continuously manufacturing a liquid crystal display panel are more specifically described with reference to FIG. 1. It will be understood that the embodiments are not intended to limit the scope of the invention.

Embodiment 1

In this embodiment, system for continuously manufacturing a liquid crystal display panel is that a system is arranged a manufacturing apparatus 100 and a inspection apparatus 300, respectively on a continuous feeder 400 for feeding the liquid crystal cell 4 and the liquid crystal display panel Y. The manufacturing apparatus 100 manufactures a liquid crystal display panel Y by a process including cutting a first long polarizing plate 11 and a second long polarizing plate 21, respectively, to form a first polarizing plate 13 and a second polarizing plate 23, while feeding the first long polarizing plate 11 and the second long polarizing plate 21 from a first polarizing plate roll 1 and a second polarizing plate roll 2, respectively, and bonding the first polarizing plate 13 and the second polarizing plate 23 to both sides of a liquid crystal cell 4, which is being fed, in such a manner that their absorption axes are perpendicular to each other. The inspection apparatus 300 optically inspects the liquid crystal display panel Y being fed. The inspection apparatus 300 includes a light application unit 311 which is placed on one side with respect to the feeder 400 so as to apply a line-shaped light beam L to the liquid crystal display panel Y being fed by the feeder 400, wherein the line-shaped light beam L is parallel to the width direction d2 (perpendicular to the drawing plane of FIG. 1) of the feeder 400; and image pickup units (312, 314) that are placed on the other side with respect to the feeder 400 and disposed in positions tilted at a predetermined angle to the feed direction d1 of the feeder 400 and the direction opposite thereto, respectively, with respect to the direction in which the line-shaped light beam L is applied from the light application unit 311, wherein the image pickup units are for continuously imaging the region irradiated with the line-shaped light beam L in the liquid crystal display panel Y being fed by the feeder 400, and the imaging is performed in a line pattern parallel to the width direction d2 of the feeder 400.

Polarizing Plate Rolls

For example, the polarizing plate roll, which is formed by winding a long polarizing plate, may be (1) a roll of an optical film laminate that is in the form of a continuous web and includes a carrier film and a pressure-sensitive adhesive-containing long polarizing plate formed on the carrier film. In this case, the system for continuously manufacturing a liquid crystal display panel further includes a cutting apparatus for forming pieces of the polarizing plate (sheet pieces) from the long polarizing plate by cutting (half-cutting or forming score lines in) the long polarizing plate (including the pressure-sensitive adhesive) at predetermined intervals in a direction perpendicular to the feed direction of the carrier film, while the carrier film is left uncut. Alternatively, for example, the polarizing plate roll may be (2) a roll of an optical film laminate including a carrier film and pieces of the polarizing plate (including the pressure-sensitive adhesive), which are formed on the carrier film and placed adjacent to one another with score line interposed between the adjacent pieces (a roll of a so-called scored polarizing plate).

For example, the polarizing plate roll 1 shown in FIG. 1 is a roll of a first optical film laminate 10 including a first carrier film 12 and a long polarizing plate 11 (including a pressure-sensitive adhesive) that has an absorption axis parallel to the feed direction (longitudinal direction) and is formed on the first carrier film 12 with the pressure-sensitive adhesive interposed therebetween. For example, the polarizing plate roll 2 is a roll of a second optical film laminate 20 including a second carrier film 22 and a long polarizing plate 21 (including a pressure-sensitive adhesive) that has an absorption axis parallel to the feed direction (longitudinal direction) and is formed on the second carrier film 22 with the pressure sensitive adhesive interposed therebetween. For example, the polarizing plate includes a polarizer (about 5 to about 80 μm in thickness) and a polarizer protecting film or films (generally about 1 to about 500 μm in thickness) formed on one or both sides of the polarizer with or without an adhesive. The optical film laminate 10 may further include any other film component such as a retardation film (generally 10 to 200 μm in thickness), a viewing angle compensation film, brightness enhancement film, or a surface protecting film. The thickness of the optical film laminate is typically in the range of 10 μm to 500 μm.

The pressure-sensitive adhesive interposed between the first or second carrier film 12 or 22 and the polarizing plate is typically, but not limited to, an acryl-based pressure-sensitive adhesive, a silicone pressure-sensitive adhesive, a urethane pressure-sensitive adhesive, or the like. For example, the thickness of the pressure-sensitive adhesive layer is preferably in the range of 10 to 50 μm. For example, the first and second carrier films 12 and 22 to be used may each be such a known conventional film as a plastic film (e.g., a polyethylene terephthalate film or a polyolefin film). According to conventional techniques, any appropriate film such as a film coated with an appropriate release agent such as a silicone, long-chain alkyl or fluoride release agent, or molybdenum sulfide may also be used as needed.

Liquid Crystal Display Panel

The liquid crystal display panel Y includes a liquid crystal cell 4 and a polarizing plate or plates provided on one or both sides of the liquid crystal cell 4, into which a driving circuit is incorporated as needed. The liquid crystal cell 4 to be used may be of any type such as a vertical alignment (VA) type or an in-plane switching (IPS) type. The liquid crystal cell 4 has a structure including a pair of substrates (first and second substrates) opposed to each other and a liquid crystal layer sealed in between the substrates.

Manufacturing Apparatus

In this embodiment, the manufacturing apparatus 100 includes a first carrier film feeder 101, a first bonding unit 102, a second carrier film feeder 103, and a second bonding, unit 104.

While feeding the first long polarizing plate 11 (first optical film laminate 10) from the first polarizing plate roll 1, the first carrier film feeder 101 cuts the first polarizing plate 11 (including the pressure-sensitive adhesive) to form a first polarizing plate 111, peels off the first-polarizing plate 111 (including the pressure-sensitive adhesive) from the first carrier film 12, and supplies the first polarizing plate 111 to the first bonding unit 102. For this purpose, the first carrier film feeder 101 includes a first cutting unit 35, a first dancer roller 30, a first peeling unit 40, and a first take-up unit 60.

The first cutting unit 35 holds the first optical film laminate 10 from the first carrier film 12 side by a suction unit 35a and cuts, the first long polarizing plate 11 in the width direction to form the first polarizing plate 111 on the first carrier film 12. For example, the first cutting unit 35 includes a cutter, a laser, or the like.

The first dancer roller 30 has function of maintaining tension on the first carrier film 12.

The first peeling unit 40 inwardly folds back the first carrier film 12 at its front end to peel off the polarizing plate 111 from the first carrier film 12. In this embodiment, a sharp knife edge is used as a non-limiting example of the front end of the first peeling unit 40.

The first take-up unit 60 takes up the first carrier film 12 from which the first polarizing plate 111 is peeled off.

The first bonding unit 102 bonds the first polarizing plate 111 from the upper side to the liquid crystal cell 4, which is fed by the feeder 400, with the pressure-sensitive adhesive interposed therebetween, when the first polarizing plate 111 is peeled off from the first carrier film 12 by the first peeling unit 40. In this embodiment, the first bonding unit 102 includes a first bonding roller 50a and a first drive roller 50b.

Each unit or apparatus as described above may be used as each apparatus for bonding the second polarizing plate 211 to the other side of the liquid crystal cell 4. Specifically, the second carrier film feeder 103 may have the same device configuration as the first carrier film feeder 101, and the second bonding unit 104 may have the same device configuration as the first bonding unit 102. For example, a second dancer roller 30 may have the same device configuration as the first dancer roller 30, a second take-up unit 60 may have the same device configuration as the first take-up unit 60, and a second bonding roller 50a and a second drive roller 50b may have the same mechanism as the first bonding, roller 50a and the first drive roller 50b.

Inspection Apparatus

The inspection apparatus 300 includes: a light application unit 311 which is placed on one side (the lower side) with respect to the feeder 400 in FIG. 1 so as to apply a line-shaped light beam L to the liquid crystal display panel Y being fed by the feeder 400, wherein the light beam L is parallel to the width direction d2 of the feeder 400; and image pickup units (a first image pickup unit 312 and a second image pickup unit 314) that are placed on the other side (upper side) with respect to the feeder 400 in FIG. 1 and each disposed in a position tilted at a predetermined angle to the feed direction d1 of the feeder 400 or the direction opposite thereto with respect to the direction P in which the line-shaped light beam L is applied from the light application unit 311, wherein the image pickup units are for continuously imaging the region irradiated with the line-shaped light beam L in the liquid crystal display panel Y being fed by the feeder 400, and the imaging is performed in a line pattern parallel to the width direction d2 of the feeder 400. It will be understood that the light application unit 311 may be placed on the upper side with respect to the feeder 400, and the image pickup units may be placed on the lower side with respect to the feeder 400, depending on the state of the liquid crystal display panel Y to be inspected.

Light Application Unit

The light application unit 311 applies a line-shaped light beam L perpendicularly to the surface of the liquid crystal display panel Y. The light application unit 311 may be any unit capable of applying a line-shaped light beam L traveling in a straight line, examples of which include a halogen lamp, a metal halide lamp, and an LED line light. The line-shaped light beam L extends in a line shape in the width direction d2 of the feeder 400, and the transverse width of the line-shaped light beam L (in a direction parallel to the feed direction d1 of the feeder 400) is shorter than the feed-direction length of the liquid crystal display panel. The light application unit 311 may further include a lens part for reducing the transverse width of the line-shaped light beam L. For example, the lens part may include a cylindrical rod lens formed along the longitudinal direction of the line-shaped light beam. The line-shaped light beam is preferably concentrated in such a manner that its transverse width can be reduced, because such concentration makes it possible to apply high-intensity light to the surface of the liquid crystal display panel and to reduce the arithmetic processing time (or to increase the processing speed) by using small-area image data to keep the data processing capacity small, so that high inspection precision can be obtained. The distance between the light application unit 311 and the feeder 400 may be appropriately controlled depending on the type or size of the liquid crystal display panel, the feed speed, or the like.

Image Pickup Units

Figure 2:
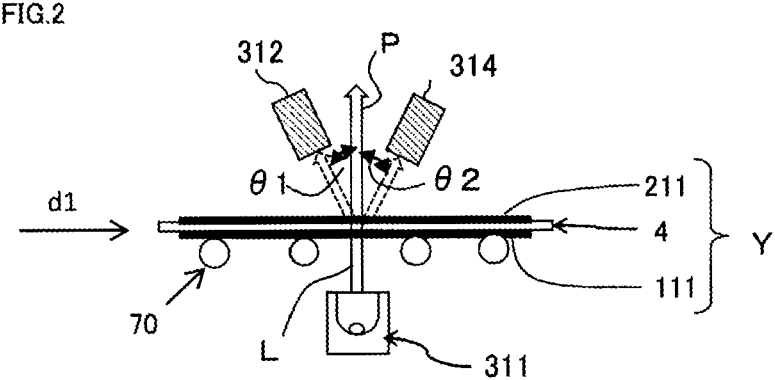
FIG. 2 is a schematic diagram showing an example of the inspection apparatus.

The image pickup units include a first image pickup unit 312 and a second image pickup unit 314. The first image pickup unit 312 is placed in a position tilted at a predetermined angle ($\theta 1$) to a direction opposite to the feed direction d1 of the liquid crystal display panel Y with respect to the direction P in which the line-shaped light beam L is applied from the light application unit 311. The second image pickup unit 314 is placed in a position tilted at a predetermined angle ($\theta 2$) to the feed direction d1 of the liquid crystal display panel Y with respect to the direction P in which the line-shaped light beam L is applied from the light application unit 311. In this embodiment, the first and second image pickup units 312 and 314 are symmetrically arranged in the feed direction d1 of the liquid crystal display panel Y and the direction opposite thereto. In other words, as shown in FIG. 2, the first and second image pickup units 312 and 314 are symmetrically ($\theta 1 = \theta 2$) arranged with respect to the plane (transmitted light plane) formed by the line-shaped light beam L applied from the light application unit 311.

The predetermined angle ($\theta 1, \theta 2$) and the distance between the first or second image pickup unit 312 or 314 and the feeder 400 are appropriately determined depending on the type or size of the liquid crystal display panel, the feed speed, or the like. For example, the predetermined angle ($\theta 1, \theta 2$) may be in the range of 1° to 45°, preferably in the range of 10° to 40° for high precision inspection. The number of the image pickup units is not limited to 2, and one image pickup unit or three or more image pickup units may be provided. The angles $\theta 1$ and $\theta 2$ at which the first and second image pickup units 312 and 314 are tilted, respectively, may be different from each other. For example, the first and second image pickup units 312 and 314 may each include CCD cameras arranged in line pattern or an optical camera such as a line sensor camera. In this embodiment, two cameras (not shown) are arranged parallel to the width direction d2 in each of the first and second image pickup units 312 and 314, which is not intended to limit how many and how the cameras are arranged.

Figure 3A:
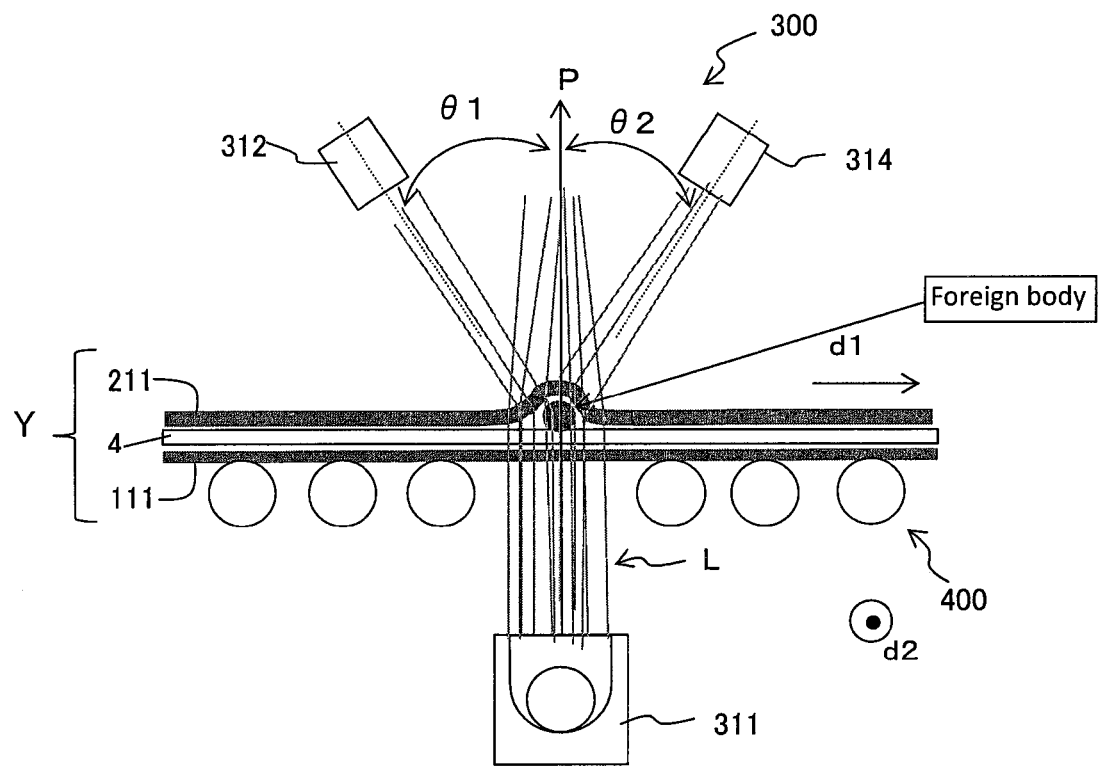
FIGS. 3A and 3b are schematic diagrams showing an example of the inspection process.
Figure 3B:
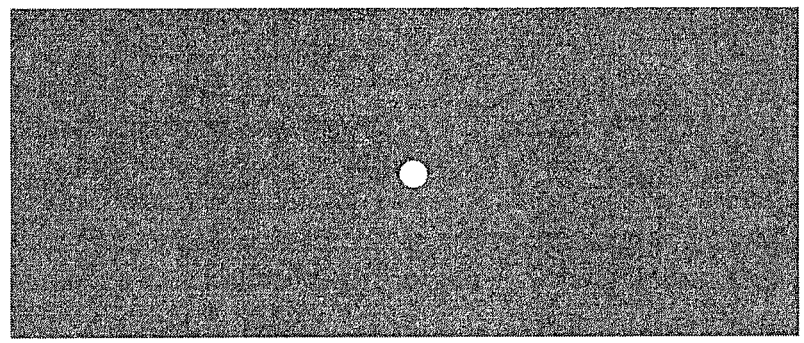

In this embodiment, when there is a foreign body between the liquid crystal cell 4 and the polarizing plate 111 or the polarizing plate 211, as shown in FIG. 3A, the first and second image pickup units 312 and 314 can selectively image the light scattered by the foreign body. As shown in FIG. 3B, therefore, the first and second image pickup units 312 and 314 can image the foreign body with a sharper contrast than that in the above case shown in FIGS. 7A and 7B.

Feeder

The feeder 400 is a continuous feeder for feeding the liquid crystal cell 4 and the liquid crystal display panel Y including the liquid crystal cell 4 and the first and second polarizing plates 13 and 23 bonded to both sides thereof. For example, the feeder 400 is configured to include feed rollers 70, suction plates and so on. In this embodiment, the feeder 400 includes a turning mechanism for horizontally turning by 90° the liquid crystal cell 4 with the first polarizing plate 13 bonded thereto and a turn-over mechanism for turning over the liquid crystal cell 4 with the first polarizing plate 13 bonded thereto. During the inspection by the inspection apparatus 300, the feeder 400 also feeds the liquid crystal display panel Y in such a manner that the absorption axis of each of the polarizing plates 111 and 211 is parallel or perpendicular to the feed direction d1.

Flow of Inspection and Other Processes

Figure 4:
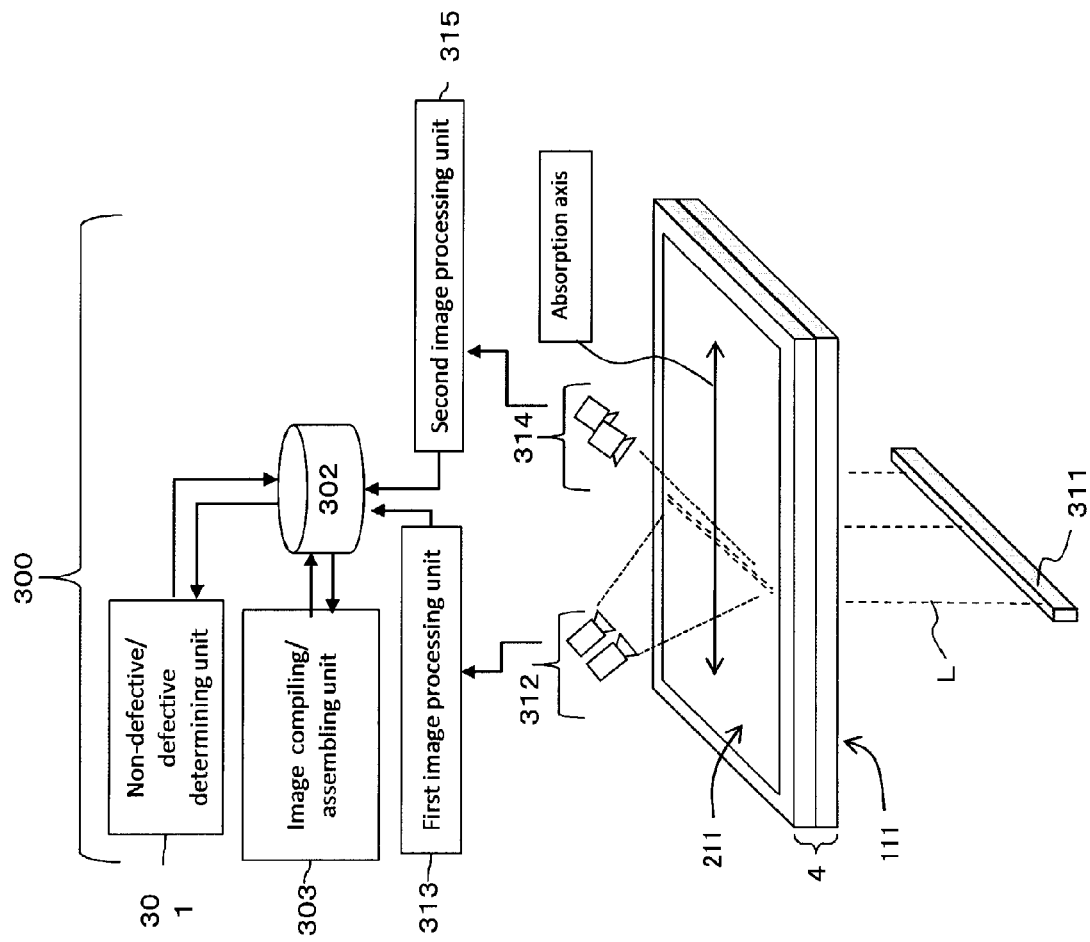
FIG. 4 is a schematic diagram showing an example of the inspection apparatus.

In this embodiment, whether the liquid crystal display panel Y is non-defective or defective is determined based on the image data obtained using the first and second image pickup units 312 and 314. For this purpose, as shown in FIG. 4, the inspection apparatus 300 further includes a first image processing unit 313, a second image processing unit 315, a memory 302, an image compiling/assembling unit 303, and a non-defective/defective determining unit 301. A description is given with reference to FIGS. 4 to 6A-6C.

Figure 6A:
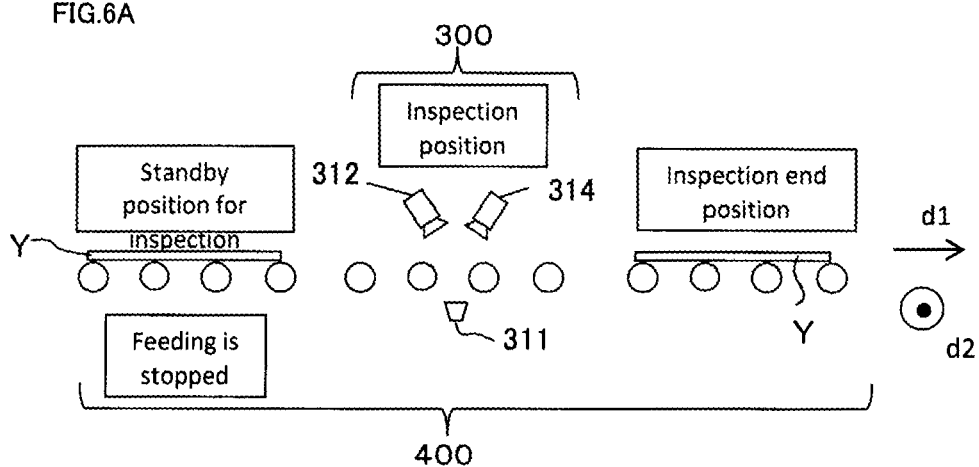
FIGS. 6A to 6C are schematic diagrams showing an example of the process of feeding a liquid crystal display panel from standby for inspection to the end of inspection.

First, a control unit (not shown) controls the feeder 400 so that the liquid crystal display panel Y is temporarily stopped at a standby position where it waits for the inspection (see FIG. 6A). The control unit then controls the feeder 400 and the inspection apparatus 300 to start the feeding of the liquid crystal display panel Y (step S1) and to start the inspection by the inspection apparatus 300 (step S2).

Figure 5:
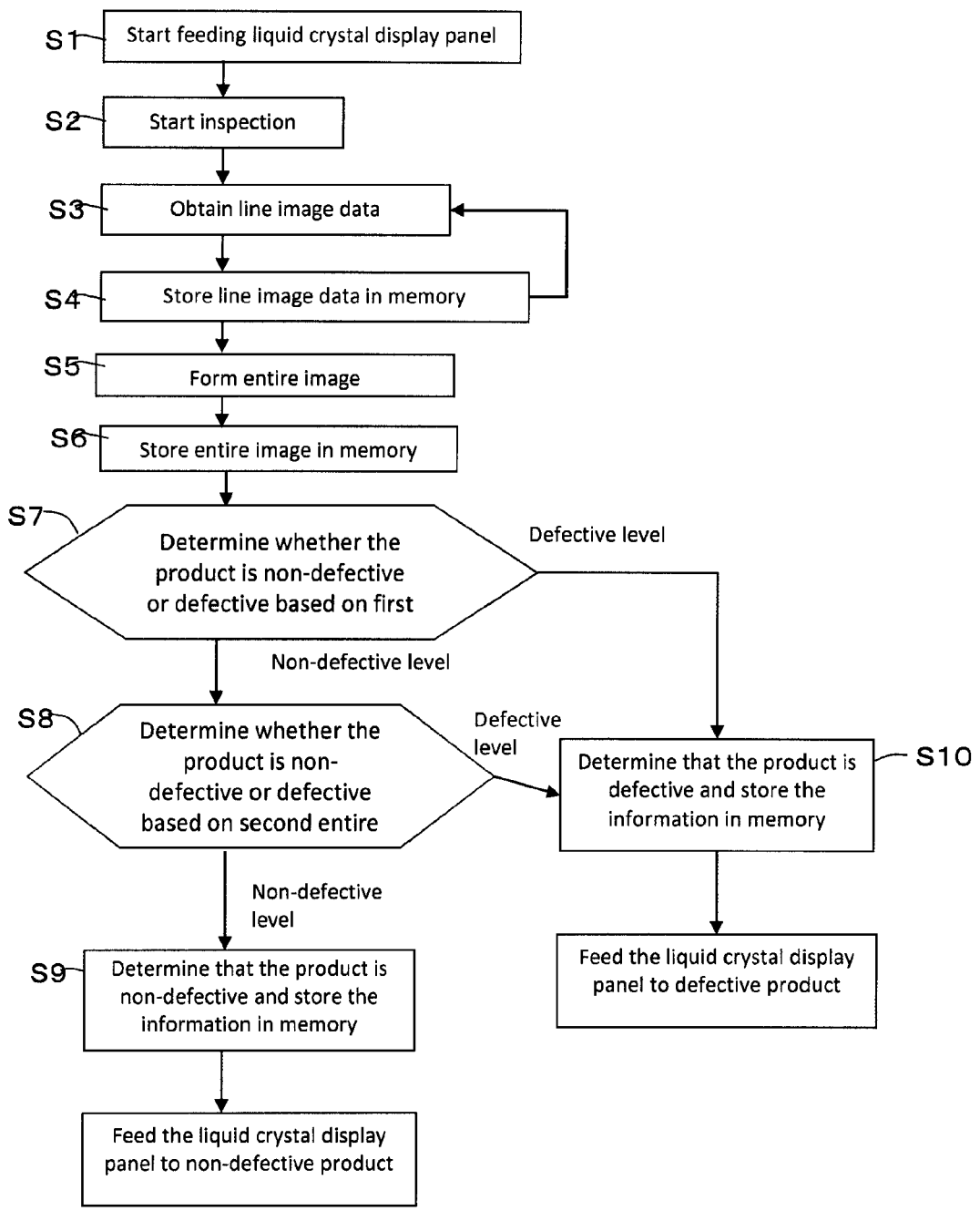
FIG. 5 is a flow chart showing an example of the process flow in the inspection apparatus.
Figure 6B:
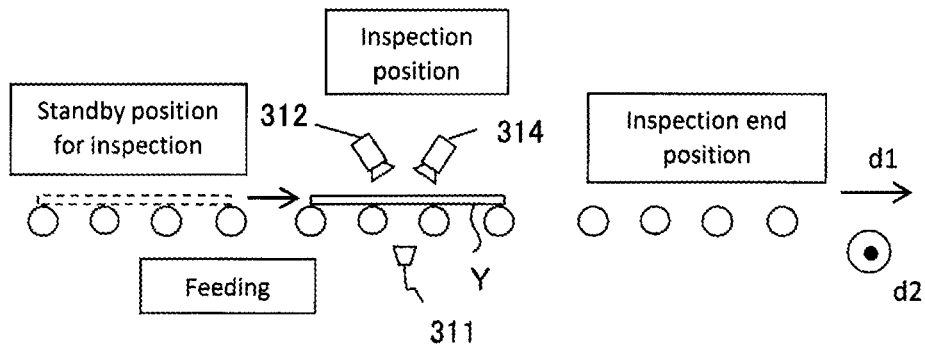
Figure 6C:
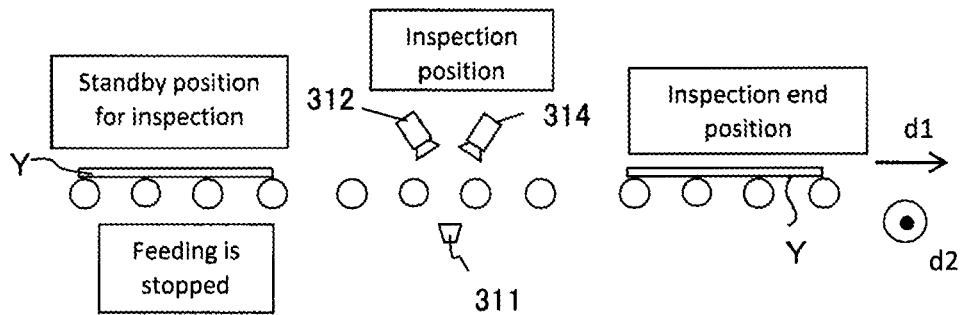

In this inspection, the control unit controls the feeder 400 to continue feeding the liquid crystal display panel Y in the feed direction d1 from the start to the end of the inspection. During this process, the control unit also controls the inspection apparatus 300 so that the light application unit 311 applies the line-shaped light beam L to the liquid crystal display panel Y and that the region irradiated with the line-shaped light beam L in the liquid crystal display panel Y is imaged in a line pattern by the first and second image pickup units 312 and 314. The line-shaped image data taken by the first and second image pickup units 312 and 314 is processed by the first and second image processing units 313 and 315, and each piece of processed line-shaped image data is stored in a memory 302 (step S3, S4. FIG. 6B shows a state at a certain point in the inspection). As shown in FIG. 5, the steps are sequentially performed until the control unit (not shown) controls the feeder 400 so that the liquid crystal display panel Y is fed to the inspection-end position (see FIG. 6C).

The image compiling/assembling unit 303 then reads the line-shaped image data, which has been processed in the first image processing unit 313, from the memory 302, and compiles the images to form the data of a first entire image of the liquid crystal display panel Y (step 5), and subsequently, the first entire image data is stored in the memory 302 (step 6). The image compiling/assembling unit 303 also reads the line-shaped image data, which has been processed in the second image processing unit 315, from the memory 302, and compiles the images to form the data of a second entire image of the liquid crystal display panel Y (step 5), and subsequently, the second entire image data is also stored in the memory 302 (step 6).

The non-defective/defective determining unit 301 then reads the first entire image data from the memory 302 and determines, based on the first entire image data, whether the liquid crystal display panel Y is non-defective or defective (step S7). If the non-defective/defective determining unit 301 determines, in this step, that the liquid crystal display panel Y is non-defective, the non-defective/defective determining unit 301 then reads the second entire image data from the memory 302 and determines, based on the second entire image data, whether the liquid crystal display panel Y is non-defective or defective (step S8). If the non-defective/defective determining unit 301 determines, also in this step, that the liquid crystal display panel Y is non-defective, the determination result indicating that the panel Y is non-defective is associated with liquid crystal display panel Y identification information and the like, and stored in the memory 302 (step S9), and the liquid crystal display panel Y is fed to a non-defective product port by the feeder 400. On the other hand, if the non-defective/defective determining unit 301 determines, in step S7 or S8, that the liquid crystal display panel Y is defective, the determination result indicating that the panel Y is defective is associated with liquid crystal display panel Y identification information and the like, and stored in the memory 302 (step S10), and the liquid crystal display panel Y is fed to a defective product port by the feeder 400.

Method for Continuously Manufacturing Liquid Crystal Display Panel

In this embodiment, a method for continuously manufacturing a liquid crystal display panel includes, as shown in FIG. 1, a manufacturing step that includes cutting a first long polarizing plate 11 and a second long polarizing, plate 21, respectively, to form a first polarizing plate 111 and a second polarizing plate 211, while feeding the first long polarizing plate 11 (first optical film laminate 10) and the second long polarizing plate 21 (second optical film laminate 20) from a first polarizing plate roll 1 and a second polarizing plate roll 2, respectively, and bonding the first polarizing plate 111 and the second polarizing plate, 211 to both sides of a liquid crystal cell 4, which is being fed, in such a manner that their absorption axes are perpendicular to each other, so that a liquid crystal display panel Y is manufactured; and an inspection step that includes optically inspecting the liquid crystal display panel Y being fed, wherein the manufacturing step and the inspection step are performed on a continuous feeder 400 for feeding the liquid crystal cell 4 and the liquid crystal display panel Y, and the inspection step includes applying a line-shaped light beam L from one side with respect to the feeder 400 to the liquid crystal display panel Y being fed by the feeder 400, wherein the line-shaped light beam L is parallel to the width direction d2 of the feeder 400; and imaging the region irradiated with the line-shaped light beam L in the liquid crystal display panel Y, wherein the imaging is continuously performed in a line pattern parallel to the width direction d2 of the feeder 400 and performed at a position that is on the other side with respect to the feeder 400 and tilted at a predetermined angle to the feed direction d1 of the feeder 400 or the direction opposite, thereto with respect to the direction in which the line-shaped light beam L is applied.

The line-shaped light beam is preferably applied in a direction perpendicular to the liquid crystal display panel Y. The region irradiated with the line-shaped light beam L in the liquid crystal display panel Y is preferably imaged at positions tilted at a predetermined angle to the feed direction d1 of the liquid crystal display panel Y and the direction opposite thereto with respect to the direction P in which the line-shaped light beam L is applied. The region irradiated with the line-shaped light beam L in the liquid crystal display panel Y is more preferably imaged at positions symmetrically tilted to the feed direction d1 of the liquid crystal display panel Y and the direction opposite thereto with respect to the direction P in which the line-shaped light beam L is applied.

Other Embodiments

In the above: embodiment, the first polarizing plate 111 is bonded to the liquid crystal cell 4, from the upper side, and then after the liquid crystal cell 4 with the first polarizing plate 111 bonded thereto is turned over (upside down and optionally turned by 90°), the second polarizing plate 211 is bonded to the liquid crystal cell 4 from the upper side. Alternatively, the first polarizing plate may be bonded to the liquid crystal cell from the lower side, and then after the liquid crystal cell is turned over, the second polarizing plate may be bonded to the liquid crystal cell from the lower side. Alternatively, after the first polarizing plate is bonded to the liquid crystal cell from the upper side, the second polarizing plate may be bonded to the liquid crystal cell from the lower side without turning over the liquid crystal cell, or after the first polarizing plate is bonded to the liquid crystal cell from the lower side, the second polarizing plate may be bonded to the liquid crystal cell from the upper side without turning over the liquid crystal cell. Alternatively, the first and second polarizing plates may be simultaneously bonded to the liquid crystal cell from the upper and lower sides.

In the above embodiment, the long polarizing plate is fed from the polarizing plate roll and cut at predetermined intervals. In the invention, this feature is non-limiting. Alternatively, for example, the long polarizing plate fed from the polarizing plate roll may be inspected for defects and cut in such a manner that defects are avoided based on the result of the inspection (by so-called skip cutting). Alternatively, defect information previously attached to the long polarizing plate or marks placed at defect positions may be read out, and the long polarizing plate may be cut in such a manner that defects are avoided based on the defect information or marks.

In the above embodiment, the long polarizing plates each have an absorption axis parallel to the longitudinal direction but the direction of the absorption axis of the long polarizing plate is not limited thereto. Alternatively, for example, the first long polarizing plate may have an absorption axis parallel to the transverse direction (width direction), and the second long polarizing plate may have an absorption axis parallel to the longitudinal direction. In this case, the turning mechanism for horizontally turning by 90° the liquid crystal cell with the first polarizing plate bonded thereto may be omitted as needed.

EXAMPLES

In an example, the inspection apparatus 300 shown in FIG. 3A is used. In the inspection apparatus 300, the light application unit 311 is placed below the feeder 400 so as to apply, to the liquid crystal display panel Y, a line-shaped light beam L parallel to the width direction d2 of the feeder 400. The first image pickup unit 312 is placed above the feeder 400 and disposed in a position tilted at 30° (θ1) to the direction opposite to the feed direction d1 of the feeder 400 with respect to the direction P in which the line-shaped light beam L is applied. The region irradiated with the line-shaped light beam L in the liquid crystal display panel Y being fed by the feeder 400 is continuously imaged in a line pattern parallel to the width direction d2 of the feeder 400 by the first image pickup unit 312. The second image pickup unit 314 is placed above the feeder 400 and disposed in a position tilted at 30° (θ2) to the feed direction d1 of the feeder 400 with respect to the direction P in which the line-shaped light beam L is applied. The region irradiated with the line-shaped light beam L in the liquid crystal display panel Y being fed by the feeder 400 is also continuously imaged in a line pattern parallel to the width direction d2 of the feeder 400 by the second image pickup unit 314. The first and second image pickup units 312 and 314 are symmetrically arranged with respect to the direction P in which the line-shaped light beam L is applied.

Figure 7A:
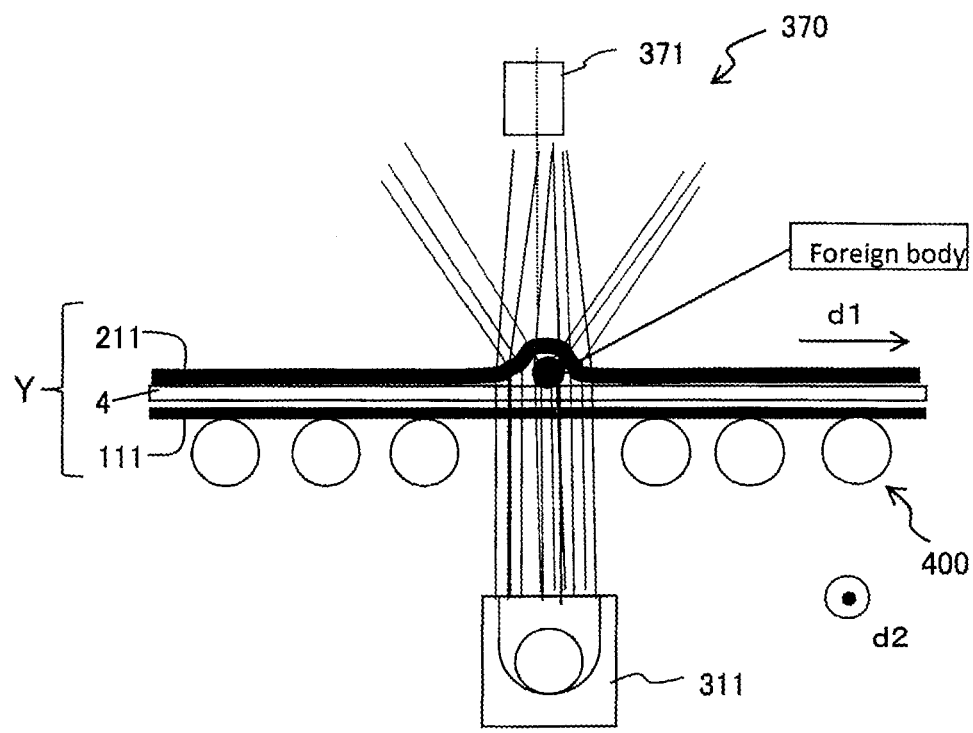
FIGS. 7A and 7B are schematic diagrams showing a conventional inspection apparatus and a light leakage image.
Figure 7B:
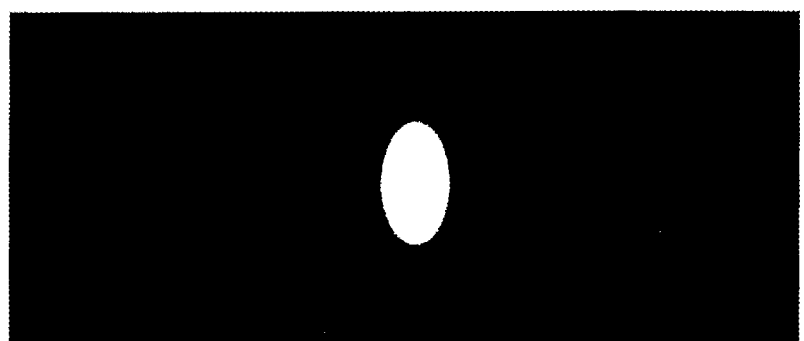

In a comparative example, the inspection apparatus 370 shown in FIG. 7A is used. In the inspection apparatus. 370; the image pickup unit 371 (not tilted) is placed opposite to the light application unit 311.

Each light application unit 311 used was a metal halide lamp (Model LS-M250A-D24 manufactured by SUMITA OPTICAL GLASS, Inc.), and a camera (Model PCME8020 manufactured by FUTEC INC.) was used in each of the image pickup units 312, 314, and 371.

Using the manufacturing apparatus 100 shown in FIG. 1, the polarizing plates 111 and 211 were bonded to both sides of the liquid crystal cell 4 in such a manner that their absorption axes were perpendicular to each other, so that the liquid crystal display panel Y was obtained. The liquid crystal cell 4 was a 32 inch TV size cell having glass substrates. The polarizing plates 111 and 211 were VEG1724DU manufactured by NITTO DENKO CORPORATION.

The manufactured liquid crystal display panels Y were visually inspected. The visual inspection was performed to previously obtain 200 defective samples, which were each determined to be defective due to a foreign body or bodies between the liquid crystal cell 4 and the polarizing plate 111 or 211. The defective samples were inspected using each of the inspection apparatus 300 (FIG. 3A) of the example and the inspection apparatus 370 (FIG. 7A) of the comparative example, and how many samples were not determined to be defective (the number of missed samples) was evaluated. In both of the example and the comparative example, the speed at which the liquid crystal display panel Y is fed by the feeder 400 during the inspection was set at 36 m/minute. The evaluation results are shown in Table 1.

TABLE 1

|  | Light application unit Direction of application of line-shaped light | Image pickup unit Tilt angle with respect to the line-shaped light application direction θ(θ1, θ2) | Number of missed samples (n = 200) |
|---|---|---|---|
| Examples | Perpendicular to liquid crystal display panel | 30° | 0 |
| Comparative examples | Perpendicular to liquid crystal display panel | 0° | 15 |

The results in Table 1 show that while the inspection apparatus 370 of the comparative example missed 15 samples, the inspection apparatus 300 of the example missed no sample. It was found that the inspection using the inspection apparatus 300 of the example was performed at the same level of precision as the visual inspection, which demonstrated that the inspection apparatus 300 of the example was effective.

What is claimed is:

1. A method for continuously manufacturing a liquid crystal display panel, comprising:
    a manufacturing step that comprises cutting a first long polarizing plate to form a first polarizing plate while feeding the first long polarizing plate from a first polarizing plate roll and bonding the first polarizing plate to first side of a liquid crystal cell which is being fed, and cutting a second long polarizing plate to form a second polarizing plate while feeding the second long polarizing plate from a second polarizing plate roll and bonding the second polarizing plate to second side of the liquid crystal cell which is being fed in such a manner that absorption axis of the first polarizing plate and absorption axis of the second polarizing plate are perpendicular to each other, so that a liquid crystal display panel is manufactured; and
    an inspection step of optically inspecting the liquid crystal display panel being fed, wherein
    the manufacturing step and the inspection step are performed on a continuous feeder for feeding the liquid crystal cell and the liquid crystal display panel, and
    the inspection step comprises: applying a line-shaped light beam from one side with respect to the feeder to the liquid crystal display panel being fed by the feeder, wherein the line-shaped light beam is parallel to a width direction of the feeder; and imaging a region irradiated with the line-shaped light beam in the liquid crystal display panel, wherein the imaging is continuously performed in a line pattern parallel to a width direction of the feeder and performed at a position that is on another side with respect to the feeder and tilted at a predetermined angle to a feed direction of the feeder or a direction opposite thereto with respect to a direction in which the line-shaped light beam is applied.

2. The method according to claim 1, wherein the line-shaped light beam is applied in a direction perpendicular to the liquid crystal display panel.

3. The method according to claim 1, wherein the region irradiated with the line-shaped light beam in the liquid crystal display panel is imaged in a line pattern at positions tilted at a predetermined angle to the feed direction of the liquid crystal display panel and the direction opposite thereto with respect to the direction in which the line-shaped light beam is applied.

4. The method according to claim 3, wherein the region irradiated with the line-shaped light beam in the liquid crystal display panel is imaged in a line pattern at positions symmetrically tilted to the feed direction of the liquid crystal display panel and the direction opposite thereto with respect to the direction in which the line-shaped light beam is applied.

5. The method according to claim 1, wherein in the imaging, the region irradiated with the line-shaped light beam in the liquid crystal display panel is imaged in a line pattern at a position or positions tilted at an angle of 1° to 45° with respect to the direction in which the line-shaped light beam is applied.

6. A method for optically inspecting a liquid crystal display panel being fed by a feeder, comprising:
applying a line-shaped light beam from one side with respect to the feeder to the liquid crystal display panel being fed by the feeder, wherein the line-shaped light beam is parallel to a width direction of the feeder; and
imaging a region irradiated with the line-shaped light beam in the liquid crystal display panel, wherein the imaging is continuously performed in a line pattern parallel to a width direction of the feeder and performed at a position that is on another side with respect to the feeder and tilted at a predetermined angle to a feed direction of the feeder or a direction opposite thereto.

7. The method according to claim 6, wherein the line-shaped light beam is applied in a direction perpendicular to the liquid crystal display panel.

8. The method according to claim 6, wherein the region irradiated with the line-shaped light beam in the liquid crystal display panel is imaged in a line pattern at positions tilted at a predetermined angle to the feed direction of the liquid crystal display panel and the direction opposite thereto with respect to the direction in which the line-shaped light beam is applied.

9. The method according to claim 8, wherein the region irradiated with the line-shaped light beam in the liquid crystal display panel is imaged in a line pattern at positions symmetrically tilted to the feed direction of the liquid crystal display panel and the direction opposite thereto with respect to the direction in which the line-shaped light beam is applied.

10. The method according to claim 6, wherein in the imaging, the region irradiated with the line-shaped light beam in the liquid crystal display panel is imaged in a line pattern at a position or positions tilted at an angle of 1° to 45° with respect to the direction in which the line-shaped light beam is applied.

* * * * *